United States Patent [19]

Sato et al.

[11] Patent Number: 4,963,639
[45] Date of Patent: Oct. 16, 1990

[54] RADIATION CURABLE RESIN COMPOSITION FOR USE IN MAGNETIC RECORDING MEDIA

[75] Inventors: Mitsuo Sato, Nagoya; Toshikazu Aoki, Owariasahi; Yukishige Takamatsu, Nagoya; Hideyasu Ryoke, Tokyo, all of Japan

[73] Assignee: Mitsubishi Rayon Company, Ltd., Tokyo, Japan

[21] Appl. No.: 136,759

[22] Filed: Dec. 22, 1987

[30] Foreign Application Priority Data

Dec. 26, 1986 [JP] Japan ................................. 61-309342

[51] Int. Cl.$^5$ ...................... C08F 30/02; C08F 20/58; C08G 18/38
[52] U.S. Cl. ........................................ 528/72; 522/81; 522/97
[58] Field of Search ................................... 522/90–98, 522/171; 528/72

[56] References Cited

U.S. PATENT DOCUMENTS

| Re. 30,772 | 10/1981 | Friedlander | 525/421 |
| 4,001,150 | 1/1977 | Juna | 523/509 |
| 4,227,979 | 10/1980 | Avmke | 522/97 |
| 4,634,602 | 1/1987 | Sirkoch | 522/94 |

FOREIGN PATENT DOCUMENTS

0219765 4/1987 European Pat. Off. .
3411880 10/1984 Fed. Rep. of Germany .
1546874 5/1979 United Kingdom .

OTHER PUBLICATIONS

Chemical Abstract, vol. 106, No. 22, Abstract #177446h, 1986.
Chemical Abstract, vol. 90, No. 12, Abstract #88908u, 1978.

*Primary Examiner*—John C. Bleutge
*Assistant Examiner*—Arthur H. Koeckert
*Attorney, Agent, or Firm*—Oblon, Spivak, McClelland, Maier & Neustadt

[57] ABSTRACT

Disclosed is a radiation curable resin composition permitting good dispersion of magnetic powders and forming a highly durable cured film, and hence suitable for use in the formation of magnetic recording media. This resin composition consists essentially of a urethane (meth)acrylate obtained by the reaction of (A) a hydroxyl-containing compound (I) composed of an amido hydroxy compound ($a_1$) having at least one amido group and at least one isocyanate-reactive hydroxyl group in the molecule, and at least one polyol compound ($a_2$) selected from polyester polyols, polyether polyols and alkyl polyols, the number of moles ($x_1$) of the hydroxyl groups present in the amido hydroxy compound ($a_1$) being from 5 to 80% of the total number of moles of the hydroxyl groups contained in component (A) and the number of moles ($x_2$) of the hydroxyl groups present in the polyol compound ($a_2$) being from 95 to 20% of the total number of moles of the hydroxyl groups contained in component (A);

(B) a polyisocyanate compound having two or more isocyanate groups in the molecule;

(C) a phosphoric ester of the general formula

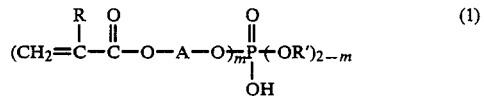

where R is hydrogen or methyl, A is a divalent alcohol residue, R' is hydrogen or an alkyl group of 1 to 4 carbon atoms, and m is 1 or 2; and (D) a hydroxyl-containing alkyl (meth)acrylate other than component (C), the urethane (meth)acrylate being further characterized in that, when the number of moles of the hydroxyl groups present in component (A) is represented by X and the number of moles of the isocyanate groups present in component (B) is represented by Y, the ratio of X to Y ranges from 1:1.1 to 1:2, the number of moles (Z) of the hydroxyl groups present in components (C) and (D) is not less than (Y-X), and the number of moles of component (C) is between 0.1 (Y-X) and 0.7 (Y-X), both inclusive.

4 Claims, No Drawings

RADIATION CURABLE RESIN COMPOSITION FOR USE IN MAGNETIC RECORDING MEDIA

BACKGROUND OF THE INVENTION

1. Field of the Invention

This invention relates to a radiation curable resin composition for use in magnetic recording media which is especially characterized by permitting good dispersion of magnetic powders and forming a highly durable cured film.

2. Description of the Prior Art

Radiation curable resin compositions have the advantage of being capable of low-temperature cure and short-time cure, and are being used in various applications. For example, a large number of radiation curable resin compositions having a variety of excellent properties, such as curing rate, surface hardness and surface smoothness of the cured resin, toughness of the cured film, and the like, have been developed and are being widely used as coating materials for plastics, metals, wood, paper and the like.

Moreover, owing to the above-described advantage, radiation curable resin compositions are also being used as materials for the formation of magnetic recording media and, in particular, for the formation of a resin layer having a magnetic powder dispersed therein, on a substrate comprising a film or sheet formed of a resin.

However, radiation curable resin compositions have poor dispersibility therein inorganic fine powders such as magnetic powders, as compared with thermoplastic type and thermosetting type resin compositions. Accordingly, in order to use radiation curable resin compositions in the formation of magnetic recording media, it is necessary to improve their dispersibility.

As a means for improving the dispersibility of radiation curable resin compositions, it is conventionally known to add thereto a dispersing agent comprising, for example, a polymer having good dispersibility. On the basis of this conception, some radiation curable resin compositions having improved dispersibility of inorganic fine powders therein have been developed and put to practical use.

However, the polymer added as a dispersing agent for the improvement of dispersing power is an inert material not participating in crosslinking reactions. Thus, its addition has the disadvantage of impairing the curing rate of the resulting resin composition and the properties, such as durability and others, of the magnetic recording media formed therewith.

SUMMARY OF THE INVENTION

It is an object of the present invention to provide a radiation curable resin composition permitting good dispersion of magnetic powders without impairing its various properties.

The above object can be accomplished by a radiation curable resin composition consisting essentially of a urethane (meth)acrylate obtained by the reaction of (A) droxyl-containing compound composed of an amido hydroxy compound ($a_1$) having at least one amido group and at least one isocyanate-reactive hydroxyl group in the molecule, and at least one polyol compound ($a_2$) selected from polyester polyols, polyether polyols and alkyl polyols, the number of moles ($x_1$) of the hydroxyl groups present in the amido hydroxy compound ($a_1$) being from 5 to 80% of the total number of moles of the hydroxyl groups contained in component (A) and the number of moles ($x_2$) of the hydroxyl groups present in the polyol compound ($a_2$) being from 95 to 20% of the total number of moles of the hydroxyl groups contained in component (A);

(B) a polyisocyanate compound having two or more isocyanate groups in the molecule;

(C) a phosphoric ester of the general formula

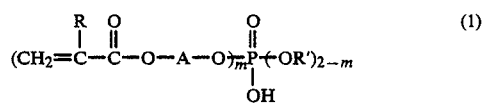

where R is hydrogen or methyl group, A is a divalent alcohol residue, R' is hydrogen or an alkyl group of 1 to 4 carbon atoms, and m is 1 or 2; and (D) a hydroxyl-containing alkyl (meth)acrylate other than component (C), the urethane (meth)acrylate being further characterized in that, when the number of moles of the hydroxyl groups present in component (A) is represented by X and the number of moles of the isocyanate groups present in component (B) is represented by Y, the ratio of X to Y ranges from 1:1.1 to 1:2, the number of moles (Z) of the hydroxyl groups present in components (C) and (D) is not less than (Y-X), and the number of moles of component (C) is between 0.1 (Y-X) and 0.7 (Y-X), both inclusive.

Owing to a well-balanced combination of the aforesaid components, the radiation curable resin composition of the present invention has at least the advantage of permitting good dispersion of magnetic powders and exhibiting high durability in the cured state and, therefore, is suitable for use in the formation of magnetic recording media and, in particular, the formation of a resin layer having a magnetic powder dispersed therein.

More specifically, the radiation curable composition of the present invention permits good dispersion of magnetic powders owing to the presence of a certain phosphoric ester. Moreover, owing to the presence of a compound having at least one amido group and at least one hydroxyl group, it exhibits excellent curability and, when cured, can form a highly durable film having a well-balanced combination of Young's modulus, strength and elongation.

DETAILED DESCRIPTION OF THE INVENTION

The radiation curable resin composition of the present invention consists essentially of a urethane (meth)acrylate obtained by the reaction of (A) a hydroxyl-containing compound composed of an amido hydroxy compound ($a_1$) having at least one amido group and at least one isocyanate-reactive hydroxyl group in the molecule, and at least one polyol compound ($a_2$) selected from polyester polyols, polyether polyols and alkyl polyols, the number of moles ($x_1$) of the hydroxyl groups present in the amido hydroxy compound ($a_1$) being from 5 to 80% of the total number of moles of the hydroxyl groups contained in component (A) and the number of moles ($x_2$) of the hydroxyl groups present in the polyol compound ($a_2$) being from 95 to 20% of the total number of moles of the hydroxyl groups contained in component (A);

(B) a polyisocyanate compound having two or more isocyanate groups in the molecule;

(C) a phosphoric ester of the general formula

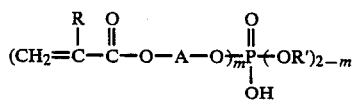 (1)

where R is hydrogen or methyl group, A is a divalent alcohol residue, R' is hydrogen or an alkyl group of 1 to 4 carbon atoms, and m is 1 or 2; and (D) a hydroxyl-containing alkyl (meth)acrylate other than component (C), the urethane (meth)acrylate being further characterized in that, when the number of moles of the hydroxyl groups present in component (A) is represented by X and the number of moles of the isocyanate groups present in component (B) is represented by Y, the ratio of X to Y ranges from 1:1.1 to 1:2, the number of moles (Z) of the hydroxyl groups present in components (C) and (D) is not less than (Y-X), and the number of moles of component (C) is between 0.1 (Y-X) and 0.7 (Y-X), both inclusive. This radiation curable resin composition has at least the advantage of permitting good dispersion of magnetic powders and forming a highly durable cured film.

The amido hydroxy compound (a₁) constituting in the hydroxyl-containing compound (I) used as component (A) in the present invention is a compound containing at least one amido group and at least one isocyanate-reactive hydroxyl group in the molecule. Specific examples thereof include the reaction products of monocarboxylic acids and amino-alcohols; the reaction products of carboxylic acid esters and amino alcohols; the reaction products of hydroxycarboxylic acids and compounds containing at least one primary or secondary amino nitrogen atom; the reaction products of inner esters of hydroxycarboxylic acids, such as lactones, and ammonia or compounds containing at least one primary or secondary amino nitrogen atom; polyamide polyols; and the like. Especially preferred are the reaction products of hydroxycarboxylic acids and compounds containing at least one primary or secondary amino nitrogen atom, and the reaction products of inner esters of hydroxycarboxylic acids, such as lactones, and ammonia or compounds containing at least one primary or secondary amino nitrogen atom.

Specific examples of the monocarboxylic acids which can be used to obtain the reaction products of monocarboxylic acids and amino-alcohols include formic acid, acetic acid, propionic acid, butyric acid, valeric acid, caproic acid, caprylic acid, 2-ethylhexanoic acid, lauric acid, myristic acid, palmitic acid, stearic acid, oleic acid, linolic acid, linolenic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, salicylic acid, p-hydroxybenzoic acid, anthranilic acid, o-methoxybenzoic acid, m-methoxybenzoic acid, p-methoxybenzoic acid and the like.

Specific example of the amino-alcohols which can be used for the aforesaid purpose include ethanolamine, diethanolamine, N-methylethanolamine, N-ethylethanolamine, N-phenylethanolamine, 2-amino-1-butanol, 4-amino-1-butanol, 2-amino-2-ethyl-1,3-propanediol, 6-amino-1-hexanol, 2-amino-2-(hydroxymethyl)-1,3propanediol, 2-amino-3-methyl-1-butanol, 3-amino-3- methyl-1-butanol, 2-amino-4-methyl-1-pentanol, 2- amino-2-methyl-1,3-propanediol, 2-amino-2-methyl1-propanol, 5-amino-1-pentanol, 3-amino-1,2-propanediol, 1-amino-2-propanol, 3-amino-1-propanol and hydroxyalkylanilines such as p-aminobenzyl alcohol and the like.

The monocarboxylic acid ester which can be used to synthesize amido hydroxy compounds by the reaction of a monocarboxylic acid ester with an amino-alcohol include various esters of the above-numerated monocarboxylic acids. The amino-alcohols which can be used for this purpose are the same as those enumerated above.

Specific examples of the hydroxycarboxylic acid esters which can be used to synthesize amido hydroxy compounds by the reaction of a hydroxycarboxylic acid with a compound containing at least one primary or secondary amino nitrogen atom include α-hydroxycarboxylic acids such as hydroxyacetic acid, α-hydroxypropionic acid and α-hydroxyisobutyric acid; β-hydroxycarboxylic acids such as β-hydroxybutyric acid; γ-hydroxycarboxylic acids such as γ-hydroxyvaleric acid; aromatic hydroxycarboxylic acids such as mandelic acid; the hydroxycarboxylic acid obtained by the reaction of phthalic anhydride with diethylene glycol; 2,2-bis(hydroxymethyl)propionic acid; and the like.

The compounds which contain at least one primary or secondary amino nitrogen atom and can react with the above-enumerated hydroxycarboxylic acids comprehend amino-alcohols, aminolactams, aliphatic mono- or polyamines, and aromatic mono- or polyamines. Specific examples of amino-alcohols useful for this purpose include the amino-alcohols which can be used in the above-described reactions with monocarboxylic acids or carboxylic acid esters. Specific examples of useful aliphatic, cyclic and aromatic amines having at least one active hydrogen atom on the nitrogen atom include methylamine, ethylamine, isopropylamine, n-butylamine, hexylamine, neoheptylamine, 2-ethylhexylamine, decylamine, aminomethyltrimethoxysilane, aminoethyltriethoxysilane, aminoethyltributoxysilane, aminobutyltriethoxysilane, aminopentyltriethoxysilane, aniline, toluylamine, xylylamine, naphthylamine, benzylamine, phenetylamine, cyclopentylamine, methylcyclopentylamine, cyclohexylamine, methylcyclohexylamine, dimethylamine, diethylamine, diisopropylamine, dibutylamine, dioctylamine, morpholine, tetrahydrofurfurylamine, piperazine, N-propylpiperazine, piperidine, 2-ethylpiperidine, 4,4'-dipiperidine, 1,3-di(4-piperidyl)-propane, 1,5-di(4-piperidyl)pentane and the like.

Specific examples of the inner esters of hydroxycarboxylic acids which can be used to synthesize amido hydroxy compounds by the reaction of an inner ester of hydroxycarboxylic acid with ammonia or a compound containing at least one primary or secondary amino nitrogen atom include γ-butyrolactone, γ-valerolactone, δ-valerolactone and ε-caprolactone. Useful compounds containing at least one primary or secondary amino nitrogen atom include common mono and diamine compounds. More specifically, they include various monoamines as enumerated above, and diamines such as 1,4-diaminobutane, 1,2-diaminocyclohexane, 1,10-diaminodecane, 1,12-diaminododecane, 1,6-diaminohexane, 1,5-diaminopentane, 1,8-diaminooctane, 1,2-diamino-2-methylpropane, 1,2-diaminopropane, 1,3-diaminopropane, 1,7-diaminoheptane, piperazine, etc.

Moreover, the reaction products of lactides and compounds containing at least one amino nitrogen atom can also be used as amido hydroxy compounds. Specific examples of useful lactides include dilactones formed by self-esterification of α-hydroxycarboxylic acids, as typified by the self-esterification product formed from two molecules of lactic acid. Specific examples of useful amino nitrogen-containing compounds include ammonia and the above-enumerated compounds containing at least one primary or secondary amino nitrogen atom.

Furthermore, polyamide polyols can also be used as amido hydroxy compounds. Such polyamide polyols can be synthesized by reacting a polyamide with a hydroxyl-containing carboxylic acid or a hydroxyl containing amine.

In this case, whether the polyamide should be reacted with a hydroxyl-containing carboxylic acid or a hydroxyl-containing amine may be decided according to the type of reactant (i.e., amine or acid) which was used in excess for the synthesis of the polyamide.

Polyamides useful for this purpose are generally produced by the reaction of a diamine with a dibasic acid. Especially preferred are the polyamides obtained by the reaction of a saturated dibasic acid with a diamine. Specific examples of useful saturated dibasic acids include oxalic acid, malonic acid, succinic acid, methylsuccinic acid, 2,2-dimethylsulcinic acid, 2,3-dimethylsuccinic acid, hexylsuccinic acid, glutaric acid, 2,2-dimethylglutaric acid, 3,3dimethylglutaric acid, 3,3-diethylglutaric acid, adipic acid, pimelic acid, suberic acid, azelaic acid, sebacic acid, phthalic acid, isophthalic acid, terephthalic acid, tetrachlorophthalic acid, 1,2-cyclohexanedicarboxylic acid, 1,3-cyclohexanedicarboxylic acid, 1,4-cyclohexanedicarboxylic acid, 1,1-cyclobutanedicarboxylic acid and the like. Specific examples of useful diamines include the diamines enumerated above in connection with the reaction with lactones.

Specific examples of the hydroxyl-containing carboxylic acids which can be reacted with such polyamides include lactic acid, glycolic acid, hydroxybutyric acid, hydroxystearic acid, and the like. Specific examples of useful hydroxyl-containing amines include 2-aminoethanol, 2-amino-1-butanol, 4-amino-1-butanol, 2-(2-aminoethylamino)ethanol, 2-amino-2-ethyl-1,3-propanediol, 6-amino-1-hexanol, 2-amino-2-(hydroxymethyl)-1,3-propanediol, 2-amino3-methyl-1-butanol, 2-amino-2-methyl-1,3-propanediol, 2-amino-2-methyl-1-propanol, 5-amino-1-pentanol, 3-amino-1,2-propanediol, 1-amino-2-propanol, 3-amino1-propanol, 2-(3-aminopropylamino)ethanol and the like.

The hydroxyl-containing compound (I) used in the present invention contains, in addition to the above-described amido hydroxy compound (al), at least one polyol compound (a2) selected from polyester polyols, polyether polyols and alkyl polyols.

Useful polyester polyols include the esterification products obtained by reacting at least one compound selected from saturated or unsaturated polycarboxylic acids and anhydrides thereof, with an excess of polyhydric alcohol.

Useful polycarboxylic acids include, for example, the saturated polycarboxylic acids enumerated above in connection with the synthesis of polyamide polyols. Also useful are ethylenically unsaturated polycarboxylic acids including maleic acid, fumaric acid, aconitic acid, itaconic acid, citraconic acid, mesaconic acid, muconcic acid and dihydromuconic acid, as well as halo and alkyl derivatives of the foregoing acids.

Useful polyhydric alcohols include, for example, ethylene glycol, 1,3- propanediol, propylene glycol, 2,3-butanediol, 1,4- butanediol, 2- ethylbutane-1,4-diol, 1,5-pentanediol, 1,6-hexanedio, 1,7-heptanediol, 1,8-octanediol, 1,9-nonanediol, 1,10-decanediol, 1,9-fecanediol, 1,4-cyclohexanediol, 1,4-bis(hydorxymethyl)cyclohexane, 2,2-diethylpropane-1,3-diol, 2,2-dimethylpropane-1,3-diol, 3-methyl-pentane-1,4-diol, 2,2-diethylbutane-1,3-diol, 4,5-nonanediol, diethylene glycol, triethylene glycol, dipropylene glycol, neopentyl glycol, glycerol, pentaerythritol, dipentaerythritol, sorbitol, mannitol, trimethylolpropane, trimethylolethane, 2,2-dimethyl3-hydroxypropyl 2,2-dimethyl-3-hydroxypropionate and 2-butene-1,4-diol.

Useful polyether polyols include those obtained by polymerizing an aldehyde, alkylene oxide or glycol according to any well-known method. Specific examples thereof are the polyether polyols obtained by subjecting formaldehyde, ethylene oxide, propylene oxide, epichlorohydrin or the like to addition polymerization under appropriate conditions.

Useful alkyl polyols include, for example, the polyhydric alcohols enumerated above in connection with the synthesis of polyester polyols.

In the hydroxyl-containing compound (I) used in the present invention, the number of moles ($x_1$) of the hydroxyl groups present in the amido hydroxy compound ($a_1$) should be from 5 to 80% of the total number of moles of hydroxyl groups and the number of moles ($x_2$) of the hydroxyl present in the polyol compound ($a_2$) should be from 95 to 20% of the total number of moles of hydroxyl groups. If $x_1$ is less than the aforesaid lower limit, the resulting resin composition will have poor curability and fail to exhibit adequate strength and durability in the cured state. On the other hand, if $x_1$ is greater than the aforesaid upper limit, the resulting resin composition will fail to exhibit high elongation in the cured state.

Specific examples of the polyisocyanate compounds which can be used as component (B) in the present invention include ethylene diisocyanate, 1,2-diisocyanatopropane, 1,3-diisocyanatopropane, 1,6-diisocyanatohexane, trimethylhexamethylene diisocyanage, 1,2-diisocyanatocyclohexane, 1,3-diisocyanatocyclohexane, 1,4-diisocyanatocyclohexane, 1,2-diisocyanatododecane, o-diisocyanatobenzene, m-diisocyanatobenzene, p-diisocyanatobenzene, bis(4-isocyanatocyclohexyl)methane, bis(4-isocyanatophenyl)methane, toluene diisocyanate, 3,3'-dichloro4,4'-diisocyanatobiphenyl, tris(4-isocyanatophenyl)-methane, 1,5-diisocyanatonaphthalene, hydrogenated toluene diisocyanate, isophorone diisocyanate, 1,3,5-tris(6-isocyanatohexyl)biuret, and phenyl-hindered toluene diisocyanate.

In the present invention, the amounts of components (A) and (B) constituting the urethane (meth)acrylate should be such that, when the number of moles of the hydroxyl groups present in component (A) is represented by X and the number of moles of the isocyanate groups present in component (B) is represented by Y, the X/Y ratio ranges from 1/1.1 to ½. If the X/Y ratio is higher than 1/1.1, the resulting resin composition will have low curing rate and will have poor dispersibility of magnetic powders therein. If the X/Y ratio is lower than ½, the resulting resin composition will fail to form a tough cured film and will have poor dispersibility of magnetic powders therein.

The phosphoric ester used as component (C) in the present invention is a compound of the general formula

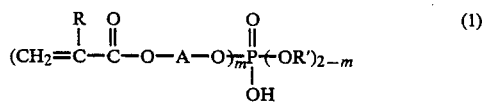
(1)

where R is hydrogen or methyl group, A is a divalent alcohol residue, R' is hydrogen or an alkyl group of 1 to 4 carbon atoms, and m is 1 or 2. Among others, the compounds of the above general formula (1) in which m is 1 are preferred from the viewpoint of dispersibility.

Specific examples of the compounds falling within the scope of the above general formula (1) include 2-methacryloyloxyethyl phosphate, di(2-methacryloyloxyethyl) phosphate, 2-acryloyloxyethyl phosphate, di(2-acryloyloxyethyl) phosphate, methyl 2-methacryloyloxyethyl phosphate, ethyl 2-methacryloyloxyethyl phosphate, methyl 2-acryloyloxyethyl phosphate, ethyl 2-acryloyloxyethyl phosphate and the like.

The phosphoric ester (C) should be used in a molar amount which is between 0.1 (Y-X) and 0.7 (Y-X), both inclusive. If its molar amount is outside the aforesaid range, the resulting resin composition will have poor dispersibility of magnetic powders therein.

SPecific examples of hydroxyl-containing alkyl (meth)acrylates other than component (C), which can be used as component (D), include 2-hydroxyethyl acrylate, 2-hydroxypropyl acrylate, 2-hydroxyethyl methacrylate, 2-hydroxypropyl methacrylate, 4-hydroxybutyl acrylate, 4-hydroxybutyl methacrylate, 2-hydroxy-3-phenoxypropyl acrylate, 2-hydroxy-3-phenoxypropyl methacrylate and the like.

The amount of the aforesaid component (D) is not critical, provided that the combined number of moles (Z) of the hydroxyl groups present in components (C) and (D) is not less than (Y-X).

The radiation curable resin composition of the present invention consists essentially of a urethane (meth)acrylate obtained by the reaction of the aforesaid components (A), (B), (C) and (D). It is known that the phosphoric ester (C) improves the ability of the resin composition to disperse magnetic powders therein, but has the disadvantage of impairing the curability of the resin composition, while the amido hydroxy compound (a₁) has the property of improving curability. One feature of the present invention is that the disadvantage of the phosphoric ester (C) can surprisingly be overcome by using a well-balanced combination of the phosphoric ester (C) and the amido hydroxyl compound (a₁). As a result, the present invention makes it possible to provide a resin composition permitting good dispersion of magnetic powders and having cured film properties suitable for various purposes.

The urethane (meth)acrylate constituting the resin composition of the present invention can be obtained by mixing the above-described components (A), (B), (C) and (D) together and allowing them to react with one another. Alternatively, it can also be prepared according to any of the following procedures.

1. The amido hydroxy compound ($a_1$) and the polyol compound ($a_2$) are reacted with the polyisocyanate compound (B) to form a urethane isocyanate intermediate product having one or more isocyanate groups in the molecule. THen, this intermediate product is, either successively or at a time, mixed and reacted with the phosphoric acid (C) and the hydroxyl-containing alkyl (meth)acrylate (D).

2. The polyisocyanate compound (B) is, either successively or at a time, mixed and reacted with the phosphoric acid (C) and the hydroxyl-containing alkyl (meth)acrylate (D) to form a urethane (meth)acrylate intermediate product having one or more isocyanate groups in the molecule. Then, this intermediate is reacted with the amido hydroxy compound ($a_1$) and the polyol compound ($a_2$).

Among the above-described procedures, it is preferable from the viewpoint of stability and other factors to add a mixture of the amido hydroxy compound ($a_1$) and the polyol compound ($a_2$) slowly to the polyisocyanate compound (B) so as to form a urethane isocyanate intermediate compound having one or more isocyanate intermediate compound having one or more isocyanate groups in the molecule, and then react this intermediate product successively with the phosphoric ester (C) and the hydroxy-containing alkyl (meth)acrylate (D).

The resin composition of the present invention may consist of the above-described urethane (meth)-acrylate compound alone or a mixture of the above-described urethane (meth)acrylate compound and one or more other compounds which can be copolymerized therewith by exposure to radiation.

Such other compounds include (meth)acrylate compounds having one or more ethylenic double bonds. For example, there may be used alkyl (meth)acrylate that are the esters or partial esters formed by the reaction of a lower alkyl polyalcohol with (meth)acrylic acid. Specific examples of such alkyl (meth)acrylates include ethylene glycol di(meth)acrylate, diethylene glycol di(meth)acrylate, propylene glycol di(meth)-acrylate, hexanediol di(meth)acrylate, glycerol tri(meth)acrylate, trimethylolpropane tri(meth)acrylate, pentaerythritol tri(meth)acrylate, pentaerythritol tetra(meth)acrylate and the like. Also useful are epoxy (meth)acrylates that are formed by the reaction of an epoxy resin with (meth)acrylic acid and have, on the average, one or more (meth)acryloyloxy groups per molecule. Specific examples of such epoxy (meth)acrylates include those obtained by the reaction of butanediol diglycidyl ether, neopentylglycol diglycidyl ether, polyethyleneglycol diglycidyl ether or bisphenol A diglycidyl ether with (meth)acrylic acid. Moreover, polyester (meth)acrylates having, on the average, one or more (meth)acryloyloxy groups per molecule are also useful. Specific examples of such polyester (meth)acrylates include bis[(meth)acryloyloxyethyl]phthalate, bis[(meth)acryloyloxyethyl] adipate, bis[2-(meth)acryloyloxypropyl]phthalate and the like.

In addition, urethane acrylates containing one more urethane linkages in the chain and having, on the average, one or more (meth)acryloyloxy groups per molecule may also be used according to the intended purpose. Specific examples of such urethane acrylates include the urethane acrylates obtained by the reaction of neopentyl glycol, tolylene diisocyanate and 2-hydroxyethyl acrylate; the urethane acrylate obtained by the reaction of bisphenol A bis(2-hydroxypropyl)-ether, xylylene diisocyanate and 2-hydroxyethyl acrylate; and the like. Also useful are unsaturated polyesters that are esters formed by the reaction of one or more ethylenically unsaturated polycarboxylic acids or a mixture of one or more such unsaturated polycarboxylic acids and one or more saturated polycarboxylic acid, with one or more polyhydric alcohol. Specific examples thereof include the unsaturated polyesters formed by the reaction of a mixture of one or more saturated polycarboxylic acids selected from phthalic anhydride, isophthalic acid, terephthalic acid, succinic anhydride, adipic acid, etc. and one or more unsaturated polycarboxylic acids selected from maleic anhydride, fumaric acid, etc., with one or more polyhydric alcohol selected from ethylene glycol, propylene glycol, neopentyl glycol, hydrogenated bisphenol A, etc. The above-described components may be used alone or in admixture of two or more.

Where ultraviolet radiation is used for curing purposes, it is usually preferably that the resin composition of the present invention additionally contains a photocatalyst compound comprising one or more members selected from photopolymerization initiators, photosensitizers and photoaccelerators.

The magnetic powders which can be dispersed in the resin composition of the present invention include those commonly used for industrial purposes. Specific examples thereof are ferromagnetic iron oxide, cobalt-doped ferromagnetic iron oxide, ferromagnetic chromium dioxide, barium ferrite and the like.

The resin composition of the present invention can additionally contain an organic solvent in order to adjust its viscosity to a desired level. The organic solvent used for this purpose may be selected from ketone compounds such as acetone, methyl ethyl ketone, methyl isobutyl ketone, cyclohexanone, etc.; ester compounds such as methyl acetate, ethyl acetate, butyl acetate, ethyl lactate, glycol acetate monomethyl ether, etc.; glycol ether compounds such as glycol diethyl ether, glycol dimethyl ether, dioxane, tetrahydrofuran, etc.; aromatic hydrocarbon compounds such as benzene, toluene, xylene, etc.; chlorinated hydrocarbons such as methylene chloride, chloroform, dichlorobenzene, etc.; and the like.

Furthermore, the resin composition of the present invention can additionally contain such additives as lubricants, abrasives, rust preventives, antistatic agents and the like.

In order to disperse a magnetic powder in the resin composition of the present invention, there may be used any of various well-known means such as three-roll mills, ball mills, high-speed agitators, paint shakers and the like.

The radiation used to cure the resin composition of the present invention can be ultraviolet radiation, electron rays, gamma rays or the like. Among others, electron rays are especially preferred. To this end, there may be used an electron accelerator of the scanning type, the curtain beam type, the broad beam curtain type or the like.

Useful electron rays are characterized by an accelerating voltage of 100 to 1,000 kV, preferably 150 to 300 kV, and an absorbed dose of 0.5 to 20 megarads, preferably 3 to 15 megarads. If the accelerating voltage is lower than 100 kV, the amount of penetrating energy will be insufficient, while if it is higher than 1,000 kV, the efficiency of energy available for polymerization will be reduced to cause poor economy. If the absorbed dose is less than 0.5 megarad, the curing reaction will not be sufficient to form a satisfactorily durable magnetic layer, while if it is greater than 20 megarads, the efficiency of energy available for curing will be reduced and the irradiated body may be overheated to cause deformation, especially of the plastic substrate.

The present invention is further illustrated by the following examples. In these examples, parts are by weight.

SYNTHESIS EXAMPLE 1

Urethane acrylates UA-1 were prepared in the following manner by using various components in the respective amounts given in Table 1 for Synthesis Example 1.

Into a flask were charged component (B), the solvent, and dibutyltin dilaurate in an amount of 0.02 part per 100 parts of components (A)–(D) combined. While this mixture was kept at 40° C., component (A) was added dropwise thereto and allowed to react for a sufficient time. THen, component (C) having dissolved therein hydroquinone in an amount of 0.1 part per 100 parts of components (A)–(D) combined was added dropwise to the reaction mixture, followed by heating and stirring at 75° C. for a sufficient time. Thereafter, component (D) was added dropwise thereto and the heating and stirring was continued at 75° C. until a viscous urethane acrylate as obtained.

COMPARATIVE SYNTHESIS EXAMPLE 2

Urethane acrylates UA-9 were prepared in the following manner by using various components in the respective amounts given in Table 1 for Comparative Synthesis Example 2.

Into a flask were charged component (B), the solvent, and dibutyltin dilaurate in an amount of 0.02 part per 100 parts of components (A), (B) and (D) combined. While this mixture was kept at 40° C., component (A) was added dropwise thereto and allowed to react for a sufficient time. Then, component (D) having dissolved therein hydroquinone in an amount of 0.1 part per 100 parts of components (A), (B) and (D) combined was added dropwise to the reaction mixture, followed by heating and stirring at 75° C. for a sufficient time. Thereafter, component (D) was added dropwise thereto and the heating and stirring was continued at 75° C. until a viscous urethane acrylate was obtained.

SYNTHESIS EXAMPLES 4 AND 5 AND COMPARATIVE SYNTHESIS

EXAMPLE 3

Urethane acrylate UA-4, UA-5 and UA-10 were prepared in the following manner by using various components in the respective amounts given in Table 1 for Synthesis Examples 4 and 5 and Comparative Synthesis Example 3.

Into a flask were charged component (B), the solvent, and dibutyltin dilaurate in an amount of 0.02 part per 100 parts of components (A)–(D) combined. While this mixture was kept at 40° C, the mixture of components (A), (C) and (D) having dissolved therein hydroquinone in an amount of 0.1 part per 100 parts of components (A)–(D) combined was added dropwise to the aforesaid mixture. Thereafter, the temperature was raised to 75° C and the heating and stirring was continued for a sufficient time to obtain a viscous urethane acrylate.

SYNTHESIS EXAMPLES 2, 3, 6 AND 7 AND COMPARATIVE SYNTHESIS EXAMPLES 1 AND 4

Urethane acrylates UA-2, UA-3, UA-6, UA-7, UA-8 and UA-11 were prepared in the following manner by using various components in the respective amounts given in Table 1 for Synthesis Examples 2, 3, 6 and 7 and Comparative Synthesis Examples 1 and 4.

Into a flask were charged component (B), the solvent, and dibutyltin dilaurate in an amount of 0.02 part per 100 parts of components (A)–(D) combined. While this mixture was kept at 40° C, component (A) was added dropwise thereto and allowed to react for a sufficient time. Then, component (C) having dissolved therein hydroquinone in an amount of 0.05 part per 100 parts of components (A)–(D) combined was added dropwise to the reaction mixture. Thereafter, the temperature was raised to 50° C. and the reaction mixture was stirred for 2 hours. Subsequently, while the internal temperature was kept at 50° C., component (D) having dissolved therein hydroquinone in an amount of 0.1 part per 100 parts of components (A)–(D) combined was added dropwise to the reaction minute. Thereafter, the temperature was raised to 60° C. and the heating and stirring was continued for a sufficient time to obtain a viscous urethane acrylate.

TABLE 1

| | Urethane acrylate | Component (A) | | | | | | Component (B) | |
|---|---|---|---|---|---|---|---|---|---|
| | | $a_1$ Type | $a_1$ (moles) | $x_1$ (moles) | $a_2$ Type | $a_2$ (moles) | $x_2$ (moles) | X (moles) | b Type | Y (moles) |
| Synthesis Example 1 | UA-1 | $a_1$-1 | 0.2 | 0.4 | $a_2$-1 | 0.3 | 0.6 | 1.0 | b-1 | 1.3 |
| Synthesis Example 2 | UA-2 | $a_1$-1 | 0.4 | 0.8 | $a_2$-2 | 0.1 | 0.2 | 1.0 | b-2 | 1.2 |
| Synthesis Example 3 | UA-3 | $a_1$-1 | 0.05 | 0.1 | $a_2$-1 | 0.45 | 0.9 | 1.0 | b-3 | 2.0 |
| Synthesis Example 4 | UA-4 | $a_1$-2 | 0.1 | 0.2 | $a_2$-2 | 0.4 | 0.8 | 1.0 | b-1 | 1.5 |
| Synthesis Example 5 | UA-5 | $a_1$-1 | 0.35 | 0.7 | $a_2$-1 | 0.15 | 0.3 | 1.0 | b-2 | 1.25 |
| Synthesis Example 6 | UA-6 | $a_1$-2 | 0.35 | 0.7 | $a_2$-2 | 0.15 | 0.3 | 1.0 | b-3 | 1.1 |
| Synthesis Example 7 | UA-7 | $a_1$-3 | 0.05 | 0.05 | $a_2$-2 | 0.475 | 0.95 | 1.0 | b-1 | 2.0 |
| Comparative Synthesis Example 1 | UA-8 | — | 0 | 0 | $a_2$-2 | 0.5 | 1.0 | 1.0 | b-1 | 2.5 |
| Comparative Synthesis Example 2 | UA-9 | $a_1$-1 | 0.5 | 1.0 | — | 0 | 0 | 1.0 | b-2 | 1.05 |
| Comparative Synthesis Example 3 | UA-10 | $a_1$-2 | 0.01 | 0.02 | $a_2$-2 | 0.49 | 0.98 | 1.0 | b-1 | 2.2 |
| Comparative Synthesis Example 4 | UA-11 | $a_1$-1 | 0.45 | 0.9 | $a_2$-1 | 0.05 | 0.1 | 1.0 | b-2 | 1.05 |

| | Urethane acrylate | X/Y | Y − X (moles) | Component (C) | | $\frac{y}{Y-X}$ | Component (D) | | Z (mole) | Solvent | |
|---|---|---|---|---|---|---|---|---|---|---|---|
| | | | | c Type | y (moles) | | d Type | (moles) | | Type | % |
| Synthesis Example 1 | UA-1 | 1/1.3 | 0.3 | c-1 | 0.12 | 0.4 | d-1 | 0.18 | 0.3 | MEK* | 30 |
| Synthesis Example 2 | UA-2 | 1/1.2 | 0.2 | c-1 | 0.14 | 0.7 | d-2 | 0.06 | 0.2 | " | " |
| Synthesis Example 3 | UA-3 | 1/2.0 | 1.0 | c-1 | 0.1 | 0.1 | d-1 | 1.0 | 1.1 | " | " |
| Synthesis Example 4 | UA-4 | 1/1.5 | 0.5 | c-1 | 0.2 | 0.4 | d-2 | 0.3 | 0.5 | Toluene | 30 |
| Synthesis Example 5 | UA-5 | 1/1.25 | 0.25 | c-2 | 0.175 | 0.7 | d-2 | 0.075 | 0.25 | " | " |
| Synthesis Example 6 | UA-6 | 1/1.1 | 0.1 | c-2 | 0.06 | 0.6 | d-1 | 0.05 | 0.11 | MEK | 30 |
| Synthesis Example 7 | UA-7 | 1/2.0 | 1.0 | c-2 | 0.1 | 0.1 | d-2 | 1.0 | 1.1 | " | " |
| Comparative Synthesis Example 1 | UA-8 | 1/2.5 | 1.5 | c-1 | 1.2 | 0.8 | d-2 | 0.8 | 2.0 | " | " |
| Comparative Synthesis Example 2 | UA-9 | 1/1.05 | 0.05 | — | 0 | 0 | d-1 | 0.1 | 0.1 | " | " |
| Comparative Synthesis Example 3 | UA-10 | 1/2.2 | 1.2 | c-2 | 0.9 | 0.75 | d-1 | 0.3 | 1.2 | " | " |
| Comparative Synthesis Example 4 | UA-11 | 1/1.05 | 0.05 | c-2 | 0.002 | 0.04 | d-1 | 0.1 | 0.102 | " | " |

TABLE 1-continued

Example 4

1: N-2-hydroxypropyl-3-hydroxybutamide.
2: N,N-bis-2-hydroxyethylacetamide.
3: N-2-hydroxypropylacetylamide.
1: Polyester diol (Mw = 520) prepared from adipic acid and diethylene glycol.
a₂-2: Polytetramethylene glycol (Mw = 850).
b-1: Toluene diisocyanate.
b-2: Xylylene diisocyanate.
b-3: Hydrogenated toluene diisocyanate.
c-1: 2-Acryloyloxyethyl phosphate.
c-2: Di(2-acryloyloxyethyl) phosphate.
d-1: 2-Hydroxyethyl acrylate.
d-2: 2-Hydroxypropyl methacrylate.
*Methyl ethyl ketone

EXAMPLES 1-7 AND COMPARATIVE and Young's modulus, and the results are shown in Table 2.

TABLE 2

|  | Urethane acrylate | Breaking*¹ strength (kg/cm²) | Elongation*¹ at breakage (%) | Young's*¹ modulus (kg/cm²) | Gloss value (%) | Abrasion wear (mg) |
|---|---|---|---|---|---|---|
| Example 1 | UA-1 | 400 | 100 | 10,000 | 100 | 0.7 |
| Example 2 | UA-2 | 500 | 70 | 11,000 | 80 | 0.9 |
| Example 3 | UA-3 | 400 | 80 | 7,000 | 90 | 0.7 |
| Example 4 | UA-4 | 300 | 70 | 7,000 | 80 | 0.8 |
| Example 5 | UA-5 | 400 | 60 | 9,000 | 50 | 1.0 |
| Example 6 | UA-6 | 400 | 30 | 8,000 | 55 | 1.2 |
| Example 7 | UA-7 | 200 | 60 | 6,000 | 40 | 0.7 |
| Comparative Example 1 | UA-8 | | Uncured | | 3 | 17.0 |
| Example 2 | UA-9 | 70 | 10 | 13,000 | 0 | 1.5 |
| Example 3 | UA-10 | | Uncured | | 5 | 15.7 |
| Example 4 | UA-11 | 100 | 15 | 12,000 | 2 | 1.6 |

*¹Properties of the coating film, about 100 μm thick, formed by applying the urethane acrylate alone onto a polyester film and then curing it.

EXAMPLES 1-4

According to the procedures described below, each of the urethane acrylates shown in Table 2 was tested to evaluate its dispersibility of a magnetic powder therein and some properties of a cured film formed thereof.

First, 10 parts of each of the urethane acrylates shown in Table 2, 30 parts of γ-iron oxide, 71 parts of a solvent, and 100 parts of (steel balls diameter 3 mm) were placed in a paint shaker and blended for 2 hours to form a coating composition. Using a doctor blade, a polyester film was coated with the coating composition to a thickness of 5 μ. After the solvent was evaporated, electron rays having an accelerating voltage of 200 kV and an exposure dose of 5 megarads were applied to the coating film under an atmosphere of nitrogen. The sample so formed was tested for dispersibility of the magnetic powder and for abrasion wear, and the results are shown in Table 2. Dispersibility of the magnetic powder was evaluated in terms of gloss values as measured with a 60°-60° gloss meter (UGV-4D Digital Variable-angle Gloss Meter; manufactured by Suga Testing Machines Co., Ltd.). Higher values indicate better dispersibility. Abrasion wear was determined by preparing a specimen having a length of 30 cm and a width of ½ inch, applying a load of 50 g to an end thereof, abrading it ten times with a piece of sandpaper (No. 1000) at a speed of 2.5 cm per second, and calculating the decrease in weight. Lower values indicate better abrasion resistance and better durability.

On the other hand, a substrate was coated with each urethane acrylate alone to a dry film thickness of about 100 μm. After the solvent was evaporated, the coating film was exposed to electron rays under the same conditions as described above. The sample so formed was tested for breaking strength, elongation at breakage,

What is claimed is:

1. A radiation curable resin composition permitting good dispersion of magnetic powders and forming a highly durable curd film, said resin composition consisting essentially of a urethane (meth)acrylate obtained by the reaction of (A) a hydroxy-containing compound mixture consisting essentially of an amido hydroxy compound (a₁) selected from the group consisting of N-2-hydroxypropylacetamide and an amido hydroxy compound having at least one amido group and more than one isocyanate-reactive hydroxyl group in the molecule, and at least one polyol compound (a₂) selected from polyester polyols, polyether polyols and alkyl polyols, the number of moles (x₁) of the hydroxyl groups present in said amido hydroxy compound (a₁) being from 5 to 80% of the total number of moles of the hydroxyl groups contained in component (A) and the number of moles (x₂) of the hydroxyl groups present in said polyol compound (a₂) being from 95 to 20% of the total number of moles of the hydroxyl groups contained in component (A);

(B) a polyisocyanate compound having two or more isocyanate groups in the molecule;

(C) a phosphoric user of the general formula

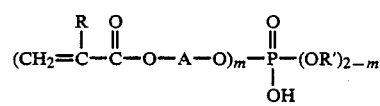

where R is hydrogen or methyl group, A is a divalent alcohol residue, R' is hydrogen or an alkyl group of 1 to 4 carbon atoms, and m is 1 or 2, and (D) a hydroxyl-containing alkyl (meth)acrylate other than component (C), said urethane (meth)acrylate being further characterized in that, when the number of moles of the hydroxyl groups present in component (A) is represented by X and the number of moles of the isocyanate groups present in component (B) is represented by Y, the ratio of X to Y ranges from 1:1.1 to 1:2, the number of moles (Z) of the hydroxyl groups present in components (C) and (D) is not less than (Y-X), and the number of moles of component (C) is between 0.1 (Y-X) and 0.7 (Y-X), both inclusive.

2. A resin composition as claimed in claim 1 wherein, in the general formula (1), is 1.

3. A resin composition as claimed in claim 1 wherein, in component (A), the amido hydroxy compound ($a_1$) comprises at least one member selected from the group consisting of (a) the reaction products of hydroxycarboxylic acids and compounds containing at least one primary or secondary amino nitrogen atoms, and (b) either the reaction products of inner esters of hydroxy-carboxylic acids and ammonia, or the reaction products of inner esters of hydroxy-carboxylic acids and compounds containing at least one primary or secondary amino nitrogen atom.

4. A resin composition as claimed in claim 2 wherein, in component (A), the amido hydroxy compound ($a_1$) comprises at least one member selected from the group consisting of (a) the reaction products of hydroxycarboxylic acids and compounds containing at least one primary or secondary amino nitrogen atoms, and (b) either the reaction products of inner esters of hydroxy-carboxylic acids and ammonia, or the reaction products of inner esters of hydroxy-carboxylic acids and compounds containing at least one primary or secondary amino nitrogen atom. to

* * * * *